United States Patent [19]

Stoll

[11] Patent Number: 4,645,182
[45] Date of Patent: Feb. 24, 1987

[54] CONVEYING DEVICE

[76] Inventor: Kurt Stoll, Lenzhalde 72, D-7300 Esslingen, Fed. Rep. of Germany

[21] Appl. No.: 750,744

[22] Filed: Jun. 28, 1985

[30] Foreign Application Priority Data

Jul. 12, 1984 [DE] Fed. Rep. of Germany ....... 3425621

[51] Int. Cl.⁴ .......................... B66D 1/00; B61B 13/12
[52] U.S. Cl. ..................... 254/264; 104/156; 92/92; 92/137
[58] Field of Search .......... 104/89, 118, 122, 155–158, 104/154; 254/228, 264, 360, 361; 92/117 R, 117 A, 89, 90, 91, 92, 137; 91/DIG. 4

[56] References Cited

U.S. PATENT DOCUMENTS

| | | | |
|---|---|---|---|
| 381,907 | 5/1888 | Connolly | 104/156 |
| 1,719,231 | 7/1929 | McLaren | 104/156 |
| 3,697,071 | 10/1972 | Anderson | 104/155 |
| 3,760,245 | 9/1973 | Halvorsen | 198/619 |
| 3,779,401 | 12/1973 | Carroll | 414/751 |
| 3,882,791 | 5/1975 | Youngscap | 198/619 |
| 4,305,448 | 12/1981 | Stoll | 92/175 |
| 4,351,229 | 9/1982 | Stoll | 92/128 |
| 4,457,423 | 7/1984 | Stoll | 104/156 |

FOREIGN PATENT DOCUMENTS 360643 4/1906 France .................. 104/155

Primary Examiner—Robert B. Reeves
Assistant Examiner—Dennis C. Rodgers
Attorney, Agent, or Firm—McGlew and Tuttle

[57] ABSTRACT

A conveying device more particularly suitable for use as a vertical hoist on construction sites or in industrial premises takes the form of a flexible and pliant hose-like pressure duct having a shuttle piston therein. The shuttle piston acts to seal off an internal portion of the duct and is fixed in place by way of a magnetic coupling with an external rider. The external rider is anchored in place so as to encompass the portion of the pliant duct in which the shuttle piston is located. The pliant duct is moved either up or down depending on whether fluid pressure is inserted into the duct above or below the fixed shuttle piston. By attaching a hook or the like to one end of the duct the pliant hose is capable of acting as a traction rope.

9 Claims, 6 Drawing Figures

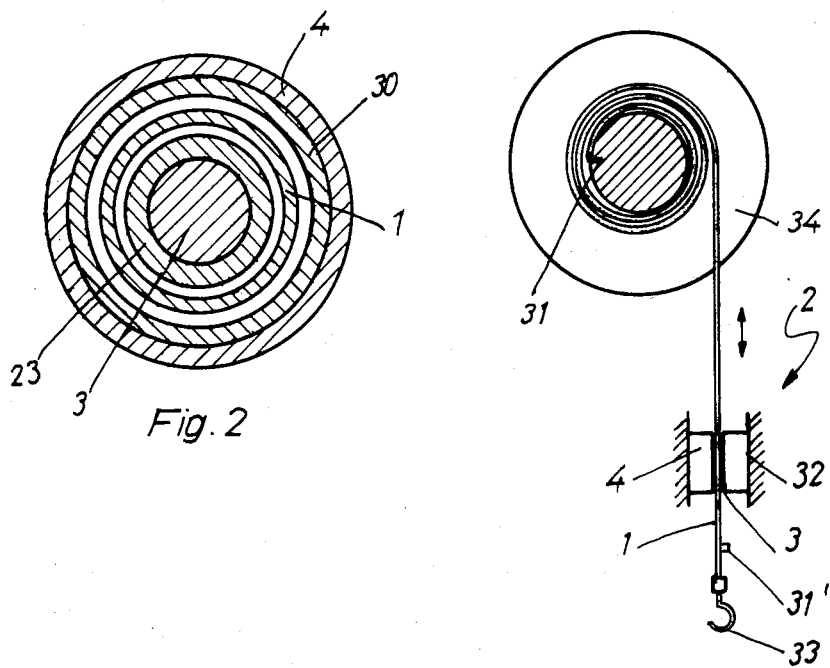
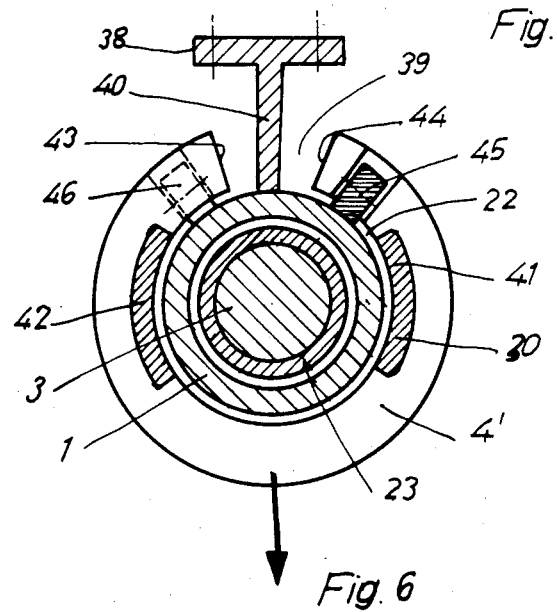

CONVEYING DEVICE

BACKGROUND OF THE INVENTION

The present invention relates to a conveying or hoisting device more particularly for use as a vertical hoist in industry or construction sites.

Such devices as so far proposed suffer from the shortcoming that they are purely mechanical and have an involved design. Furthermore they have a high purchase price, high maintenance costs and a rapid wear rate. For example plant conveying devices make use of very long chains running over sprocket wheels and driven by a chain or belt drive for the transmission of driving power. Therefore two separate, costly systems are needed, one for the input of power and the other for the application of the power to the load. Owing to the high load forces the separate links of the chain and the teeth of the gears are subject to a high wear rate. A further shortcoming of such systems is their lack of mobility, since once installed they may only be shifted to a different site of application at great expense.

SHORT SUMMARY OF THE INVENTION

One object of the present invention is to remedy these disadvantages of the prior art.

A further purpose of the invention is to devise a conveying and hoisting contrivance which is cheap to manufacture.

A still further aim of the invention is to design such an apparatus that has a very low wear rate and needs very little upkeep.

Yet another aim of the invention is to provide an apparatus of the type in question which may be easily shifted to different working sites and errected thereat.

In order to achieve these or other aims, the conveying and hoisting device of the present invention is characterized by comprising a flexible and pliant hose-like gas-tight pressure duct and a runner fitting the duct, such runner being made up of a drive shuttle placed within said duct so as to divide the lumen thereof into two separate pressure chambers, and a rider encompassing the duct on the outside thereof completely or partially around said drive shuttle, the shuttle and the rider being drivingly connected by force transmitting means, relative motion between the drive shuttle and the rider on the one hand and the pressure duct on the other hand being possible in the length direction of the duct, the pressure duct having connection means for the supply of fluid under pressure into each of the pressure chambers. These measures make it possible to replace a chain and gear hoist or traction system by a pressure duct thrust system with a low wear rate. The flexible and pliant form of the pressure duct makes it easy to lay, more particularly along curved paths in order to avoid hinderances, without having to employ guide or support members such as curved or angular structures. Since the pressure duct is sealed off at both ends so as to be pressure tight, there is a possibility of internally pressurizing it. It is more particularly possible to pressurize the two pressure chambers in the pressure duct, which are separated from each other by the drive shuttle, with fluid under pressure alternately. This makes it possible for the pressure duct and the drive shuttle to be moved in relation to each other in the length direction of the pressure duct. In order to transmit the motion of the drive shuttle in the pressure duct to the outside it is coupled by a force transmitting connection with the rider partially or completely encompassing the outside of the pressure duct. As compared with known devices this arrangement has the advantage that the pressure duct may not only be used as a traction element but also as a carrying element. This dual function cuts down the costs of material considerably. A further very useful effect of a device in accordance with invention is the low cost of producing it, since the pressure duct may be cheaply produced in running lengths.

The invention may be used for a wide variety of applications, since it is a very simple matter to transport it to different sites and it does not have to have a separate drive unit, as for example a motor or engine for driving gear wheels.

In accordance with a preferred further development of the invention, the force transmitting connection between the drive shuttle and the rider is by way of a magnet arrangement. In such a case it is the most expedient to manufacture the duct of a non-magnetizable material in order not to impair the action of the magnetic forces between the drive shuttle and the rider. This feature brings with it the useful effect that the connection between the two bodies may be complete without any physical contact, and in particular no rigid connection is called for. This guarantees that the pressure duct may be made gas-tight for its full extent without any seals being required, which would be subject to wear.

As part of a further useful feature of the invention, both in the drive shuttle and also in the rider the magnet system is made of a plurality of successively placed axially magnetized annular magnet disks, there being an iron yoke disk between each two magnet disks. This type of magnet array involves an unexpectedly high increase in the magnetic force, more especially owing to the use of the iron yoke disks, without any increase in the size of the structure of the drive arrangement.

In accordance with a further useful feature of the invention there is a radial gap between the separate magnet assemblies which prevents the magnet assemblies contacting the pressure duct. For this reason there is no possibility of friction and relative motion of the drive arrangement is possible without any very great force being applied.

As part of a further highly advantageous feature of the invention the pressure duct is adapted to be rolled up on a drum in the manner of a cable. This makes it a very simple matter to transport the device from place to place without its needing much space. The use of the device in accordance with the invention at different sites is therefore made very much more readily possible, for example as a lift or crane on construction sites, situations where a very high degree of mobility is required.

The fact that it is possible for the rider to be made fast on some external structure, as for example on a load bearing hook makes it possible for the pressure duct to be used as a sort of traction rope. Owing to the coupling between the drive shuttle and the rider the shuttle as well will be fixed in position and on putting one of the duct chambers under pressure it is possible to produce a movement of the pressure duct in relation to the drive shuttle. The device of the invention is therefore able to be used as a hoist or crane, in which case a hook or the like may be attached to one end of the pressure duct.

If on the other hand the pressure duct is fixed in place, then by the supply of fluid under pressure into the pressure chambers it is posible to produce a relative motion of the drive shuttle in the length direction of the pressure duct. In this case the device of the invention may for example be used as a conveying or hoisting device within industrial plant. Furthermore it may be used as a return mechanism for chair lifts used in children's playgrounds. The flexible and pliant form of the pressure duct even makes it possible for the duct to be suspended in a catenary without impairing its function. It accordingly becomes possible to bridge over large distances without having to support the pressure duct at intermediate points between its ends.

In accordance with a further useful feature of the invention, the pressure duct may be provided with longitudinally aligned suspension means on its outer face, or with a continuous suspension rail, in order to hold the pressure duct if this should be necessary in a given application. In such a case it is then an advantage to construct the rider of the runner in such a way that the cross section does not take the form of a complete ring and has a radially directed V-like gap therein aligned with the position on the pressure duct where the suspension means or rail is attached. This feature at the same time prevents the rider being twisted about the pressure duct while simultaneously stiffening the entire unit. If the rider is designed with two support rollers, which are best axially offset, and are adapted to run on the circumference of the pressure duct to support the rider, the carrying capacity of the device will then be enhanced, since even when the load is at a maximum it is not possible for the rider to contact the pressure duct, against the magnetic force, or run skew and therefore impede motion.

The advantageous feature of manufacturing the pressure duct of resin or of a flexible metal such as copper or brass makes it possible for the duct to be rolled up and for it to span large distances in the form of a catenary. A further point is that such material is commercially available in running lengths in coils so that the costs of the pressure duct will be low.

Further advantageous developments of the invention will be seen from the following account of working examples thereof as illustrated in the accompanying drawings.

LIST OF THE SEVERAL VIEWS OF THE FIGURES

FIG. 2 is a section as taken on the line A—A of FIG. 1 through the hoisting and conveying device.

FIGS. 3 to 5 show three advantageous forms of the invention.

FIG. 6 is a section taken through the device of the invention as in FIG. 5 taken on the line B—B therein.

Figure 1:
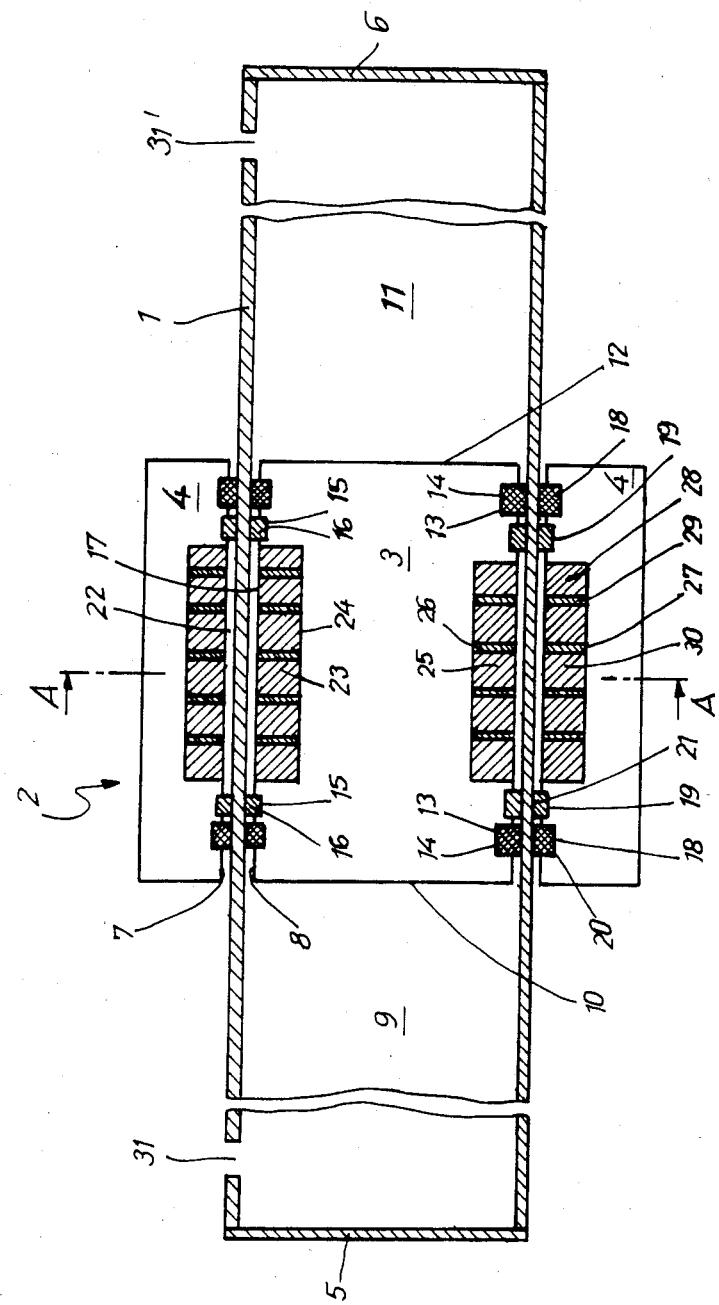
FIG. 1 is a longitudinal section through a hoisting and conveying unit in accordance with the invention.

DETAILED ACCOUNT OF WORKING EXAMPLES OF THE INVENTION.

The device of the invention takes the form of a flexible and pliant hose-like pressure duct 1 made of nonmagnetic material and a runner 2 matching the form of the pressure duct. The duct 1 can be made of synthetic resin or flexible metal like copper or bronze. The runner 2 comprises an internal drive shuttle 3 able to move axially in the pressure duct 1 and an axially moving external rider 4 on the outside of the pressure duct. It is an advantage if the inner face 7 of the rider 4 is aligned with and opposite to the outer face 8 of the drive shuttle 3. The pressure duct 1 is shut off at both its ends by end walls 5 and 6 so as to be gas-tight and in the pressure duct 1 a pressure chamber 9 is formed which is defined by the end wall 5, the wall of the pressure duct 1 and one end face 10 of the drive shuttle 3. There is furthermore a second pressure chamber 11 that is defined by the second end wall 6, the wall of the pressure duct 1 and the second end face 12 of the drive shuttle 3. For each of the pressure chambers 9 and 11 there is a port 31 and 31', preferably in the vicinity of the end walls 5 and 6 of the pressure duct 1 to make possible connection with a pressure fluid line. On referring to FIG. 2 it will be seen that the rider 2 is best made with an annular form and the drive shuttle 3 has the form of a solid cylinder or plug with a circular cross section dividing the internal space of the duct into the two chambers. The drive shuttle 3 has respective circumferential grooves 13 in its outer face 8 adjacent to its end faces 10 and 11 to receive respective seal rings 14. The seal rings 14 are so placed that their outer faces make sealing contact with the bore or inner face of the duct 1 and form a sort of gas-tight partition between the two pressure chambers 9 and 11. Furthermore there are two further circumferential grooves 15 in the circumferential face of the drive shuttle 3, such grooves also being in the vicinity of the end faces of the drive shuttle 3 and being offset slightly in an axial direction in relation to the circumferential grooves 13. The circumferential grooves 15 may be between the two sealing rings 14 or between one such sealing ring 14 and the end face of the shuttle next thereto, i.e. not between the rings 14. The external diameter of the drive shuttle 3 is slightly less than the bore diameter of the pressure duct 1, this resulting in the presence of a radial gap between the pressure duct and the shuttle. The gap serves to prevent the drive shuttle 3 contacting the pressure duct 1. The size of the gap is kept constant by runner rings 16 let into further circumferential grooves 15 and projecting beyond the outer cylindrical face 8 of the drive shuttle 3 by a distance equaling the size of the gap.

The rider 4, that is best made with the same axial size as the drive shuttle 3, also has circumferential grooves 18 and 19 in its inner face 7, which are axially aligned with the circumferential grooves 13 and 15 in the said drive shuttle 3. In this case as well one of the two grooves receives a sealing ring 20 and the other a runner or slip ring 21. The runner rings 21 stand slightly proud of the inner face or bore of the rider 2 and keep the rider 4 clear of the pressure duct 1. The internal diameter of the rider 4 is therefore a little larger than the external diameter of the pressure duct 1. The sealing rings 20 serve to prevent dirt making its way into the gap 22 between the rider 2 and the pressure duct 1 so that no trouble conditions are likely when the rider is moved in relation to the pressure duct 1.

The two radial gaps 17 and 22 are necessary because both the drive shuttle and also the rider have magnet arrangements on their sides adjacent the pressure duct 1 and which are to be kept clear of the duct. The respective magnet arrangements constitute a force transmitting coupling between the drive shuttle 3 and the rider 4 so that the two of them move pari passu and in synchronism. As will be seen from FIG. 1 a magnet arrangement 23 comprises alternating annular magnet disks 25 and iron yoke disks 26 set in a circumferential groove 24 in the outer face 8 of the drive shuttle, the annular magnet disks being best magnetized in the axial direction. The annular magnet disks 25 are so arranged that in all cases like poles are opposite to each other.

There is a preferably exactly radially opposite magnet arrangement 30 in a circumferential groove 27 in the inner face or bore 7 of the rider 4, such arrangement 30 comprising annular magnet disks 28 placed exactly radially opposite the annular magnet disks 25 and iron yoke disks 29 exactly opposite the iron yoke disks 26. In the case of the magnet arrangement 30 of the rider 4 as well, like poles of the axially magnetized annular magnets are placed opposite each other, the array of the series of poles being opposite to that in the case of the magnet arrangement 23. The presence of the intermediate iron yoke disks in each case increases the magnetic force, and the attraction between the two magnet arrangements is very much greater than would be the case if there were only simple, single-piece magnets.

It is possible to dispense with the runner rings 16 and 21 in the case of a further design of the runner 2 if the diameter of the annular magnet and iron yoke disks is such that those of their surfaces nearest the surfaces of the pressure duct are placed within the outer circumference 8 and of the inner circumference 7 of the drive shuttle and rider respectively.

An account will now be given of operation of the hoist and conveyor device of the invention. The drive shuttle, forming a body separating the pressure duct 1 into two chambers, has its runner ring 16 resting on the bore 7 of the pressure duct 1. At the same time the sealing rings 14 produce a seal between the shuttle and the pressure duct. If now for example fluid under pressure is introduced through the port 31 of the first pressure chamber 9 while at the same time port 31' is opened to vent the other pressure chamber 11, the volume of the pressure chamber 9 will increase in step with a decrease in the volume of the pressure chamber 11 and there will be a relative movement between the drive shuttle and the pressure duct 1 in the length direction of the duct. Because of the magnetic coupling between the magnet arrangement 30 of the rider 4 and the magnet arrangement 23 of the drive shuttle 3 the rider will be moved in step with the drive shuttle 3 at all times. If the flow of pressure fluid is reversed the relative motion will be reversed.

In accordance with a further construction of the invention the hoist and conveying device may take the form of an oblique hoist for roof repairs, a vertical hoist for construction sites to lift containers of material or for external use on facades, such a device being shown in FIG. 3. The rider 4 is in this case anchored in place and does not move. If now pressure fluid is supplied through one of the ports 31 and 31' the pressure duct will be moved in relation to the rider, because the drive shuttle 3 is coupled with the rider 4 for the transmission of force and accordingly is also prevented from moving. The direction of such motion will depend on which chamber is charged with the fluid under pressure. It is possible to have a hook 33 or the like at one end of the pressure duct so that a load may be attached thereto and transported. In order to facilitate operation the pressure duct 1 may have its end opposite to the end with the hook 33 attached to a suspension device such as the drum device 34 on which the duct may be coiled and wound up. This is made possible by the flexible and pliant properties of the pressure duct. For transport to another site there is a practical advantage in this respect inasfar as the duct may then be rolled up on the drum device 34 so that it takes up little space. The supply of the fluid under pressure to the port 31 is preferably by way of a pipe or the like in the drum device and connected with the one end of the pressure duct 1 at its port 31. The other end of the pipe opens in the vicinity of the axis of rotation of the drum device into the atmosphere. The connection of the pressure supply to the port 31' may simply be by way of a free and loosely hanging line or by way of a supply pipe running along the pressure duct 1 parallel to it so that it is moved about with it. For this purpose it is furthermore possible for the pressure duct 1 to be so designed that it has an inner, second duct running in the length direction of the pressure duct 1, whose one end is directly connected with the port 31' for supply of fluid thereinto. The other end of this duct, which preferably extends right the way along the pressure duct 1, may then be supplied with pressure fluid in the vicinity of the center of the drum device 34. (This particular form of the invention is not illustrated in the figures.)

Figure 4:
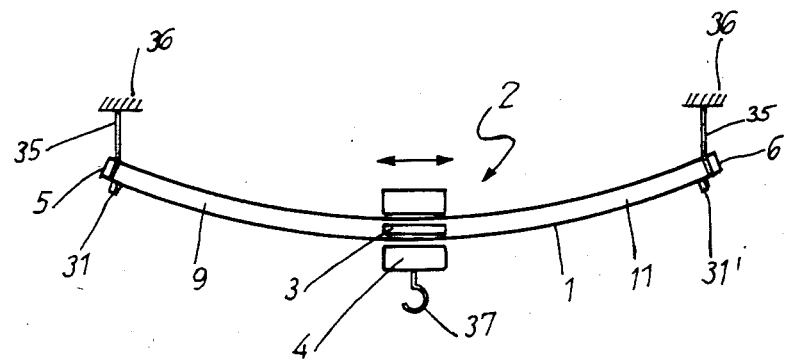

In accordance with a further form of the invention as shown in FIG. 4 the pressure duct 1 has its ends near walls 5 and 6 fixed by a cleat-like attachment 35 to a mount 36 that is not described in detail. The rider 4 of the runner 2, corresponding in form to the pressure duct 1, has a load suspending device 37 as for example a hook for the attachment of a load. By the supply of fluid under pressure to one of the pressure chambers 9 and 11 in the pressure duct 1 through one of the ports 31 and 31' the drive shuttle 3, located in the pressure duct 1, may be moved along it, such motion being also performed by the rider 4 coupled with the shuttle for the transmission of force. It will be clear that fluid under pressure is only supplied through one of the ports 31 or 31' at a time, the other respective port being open. The arrangement described may for example be used as a pneumatic tube conveyor for goods that are larger than the diameter of the duct or as a conveyor in plant between two workpoints without having to use chains or gearwheels.

The flexible and pliant form of the pressure duct even makes it possible for the pressure duct to be placed so that it hangs down as a festoon without any functional disadvantage. It is then possible to span large distances without intermediate supports being necessary for the pressure duct. Further uses for this form of design would for example include the hoisting of flags or signals or for setting sails on sailboats. In such cases the principle direction of motion of the device of the invention will be generally vertical. The arrangement in accordance with the invention may however also be used by way of example for moving targets in shooting ranges or as a return mechanism for chair lifts on playgrounds, or as a catapult for model airplanes. In accordance with the particular application, the rider 4 of the runner 2 will be fitted with suitable hook means.

Figure 5:
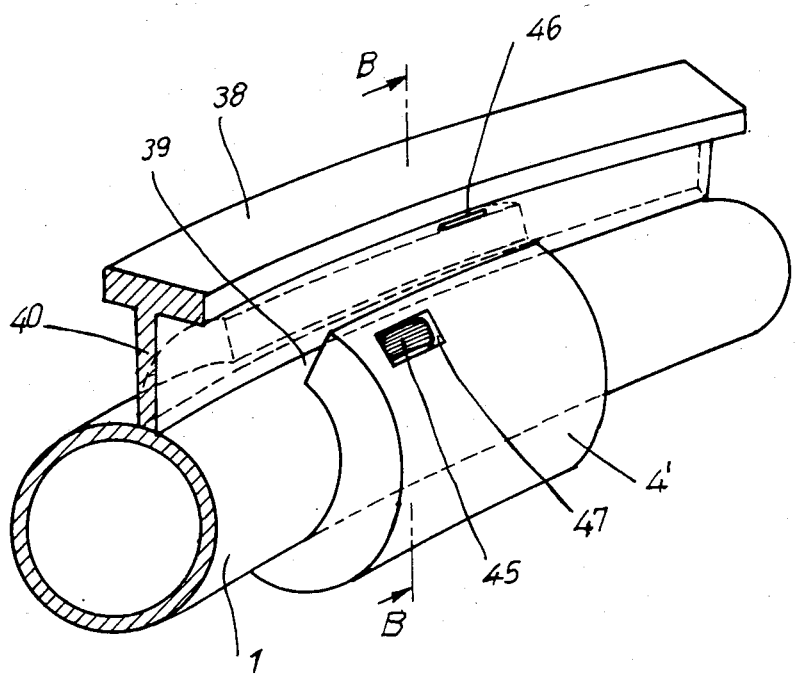

A further form of the invention will be seen in FIG. 5. In this case the pressure duct 1 has a suspension rail 38 mounted on it and extending in the length direction. This rail will be used when it is especially important for the pressure duct to be straight. The suspension rail 38 is continuous from end to end of the pressure duct in the present example, but it is possible to have a row of separate suspension means like hooks, that are integrally combined with the pressure duct or are integrally manufactured therewith. It is an advantage if such separate suspension means are placed in a row successively along the length of the pressure duct 1. In combination with this suspension means for the pressure duct 1 the rider 4' is modified somewhat. Its cylindrical form has a radial slot 39 running in from a point on its circumference.

The slot 39 extends along the full length of the rider 4'. Its breadth is in this respect so selected that it is at least equal to the breadth of the foot part 40 of the suspension rail 38 and is however preferably larger than it. In order to guarantee satisfactory running properties of the rider 4 on the pressure duct 1 the breadth of the slot 39 should not exceed one quarter of the circumference of the rider. As indicated in FIG. 6 the runner 2 is so coupled with the pressure duct 1 that the foot part 40 of the suspension rail 38 is in the slot 39 of the rider 4'. Therefore the rider 4' has an unlimited freedom of movement in the length direction of the pressure duct 1 and is at the same time keyed thereon so that it may not turn about the axis thereof. The magnet arrangement 30 in the rider 4' is preferably not in this case made up of annular disks but may be divided up into the two rows 41 and 42 of magnets, which, as seen in the length direction of the rider 4', each consist of an alternating succession of magnet and iron yoke segments. The thickness of the individual segments is in this case approximately the same as the thickness of the annular disks 28 and 29, same being shown in FIG. 1. The individual magnet and iron yoke segments extend in the circumferential direction of the rider 4' each over about one quarter of the circumference and are advantageously placed exactly opposite each other. It is naturally possible for the magnet arrangement 30 also to be composed only of one single magnet row, which is then best adapted to the shape of the rider 4'. The design of the magnet arrangement 23 in the drive shuttle 3 may still be the same as in FIG. 1.

Since it is not possible to have any magnets at the part of the rider 4' interrupted by the slot 39, it is advantageous to provide respective support wheels 45 and 46 in the vicinity of the rider ends 43 and 44 in the rider 4', more especially when the rider is to be heavily loaded in the direction marked by the arrow in FIG. 6. The axles of such wheels are mounted in the recesses 47 in the rider 4' so that the axles are tangential to the circumference. The support wheels are sunk so far into the recess that they project from the rider 4' by a distance corresponding to the size of the gap 22. It is an advantage if the support wheels 45 and 46 are offset from each other in the length direction of the duct so that one support wheel is in the vicinity of the end wall of the rider and the other support wheel is located in the vicinity of the opposite rider end wall. This makes possible free running of the rider 4 in the length direction of the pressure duct without a skew motion and even when under a heavy load.

In accordance with a further form of the invention, which is not illustrated, the suspending rail is placed on the side of the pressure duct and the rider 4 has a C-like cross section, with at least one support wheel on its end nearest to the topside of the periphery of the pressure duct. In the side on the lower side of the pressure duct there is a magnet segment arrangement extending around about one quarter of the circumference of the pressure duct.

I claim:

1. A conveying device comprising a flexible and pliable hose-like hollow pressure duct having opposite ends and defining an inner space, means for closing said opposite ends of said pressure duct for rendering said space gas-tight, a suspension device operatively connected to one of said ends of said pressure duct for suspending said pressure duct, a piston-like runner disposed in said space and in sealing contact with an inner wall of said pressure duct for dividing said space into two pressure chambers, said runner substantially sealing said pressure chambers from each other, a pressure port near each end of the pressure duct for receiving and discharging pressure fluid for moving said runner with respect to said pressure duct by expanding and contracting said pressure chambers a stationary external rider at least partly embracing said pressure duct in the vicinity of said runner, a first magnetic arrangement fixed to said runner and a second magnetic arrangement fixed to said rider, said first and second magnetic arrangements magnetically attracting each other for holding said runner fixed with respect to said rider, whereby said pressure chambers are expandable and contractable to move said pressure duct while said runner and rider are stationary for moving said end of the pressure duct which is opposite from said suspension device, said pressure duct thus acting as a traction rope.

2. A device according to claim 1 wherein said suspension device comprises a rotatable drum, said one end of said pressure duct which is operatively connected to said suspension device being fixed to said drum and said pressure duct being windable on said drum with movement of said pressure duct towards the drum.

3. A device according to claim 1 wherein said pressure duct is made of synthetic resin.

4. A device according to claim 1 wherein said pressure duct is made of a material selected from the group of copper and brass.

5. A device according to claim 1 wherein said runner and said rider both include a pair of axially spaced running rings which engage said pressure duct and define a gap between said rider and said pressure duct and between said runner and said pressure duct, said running rings being positioned on opposite sides of the magnetic arrangements for each of said runner and rider.

6. A device according to claim 1 wherein said first and second magnetic arrangements each comprise a plurality of alternating iron yoke disks and axially polarized magnetic ring disks, all of said disks extending axially on said respective runner and rider and attracting each other in a radial direction.

7. A device according to claim 6 wherein alternating magnetic disks of said first and second magnetic arrangement have opposite poles facing each other.

8. A device according to claim 7 wherein said suspension device comprises a rotatable drum, said one end of said pressure duct which is operatively connected to said suspension device being fixed to said drum and said pressure duct being windable on said drum with movement of said pressure duct towards the drum.

9. A device according to claim 8 wherein said runner and said rider both include a pair of axially spaced running rings which engage said pressure duct and define a gap between said rider and said pressure duct and between said runner and said pressure duct, said running rings being positioned on opposite sides of the magnetic arrangements for each of said runner and rider.

* * * * *